United States Patent
Klein

(10) Patent No.: US 6,833,100 B2
(45) Date of Patent: Dec. 21, 2004

(54) MOGUL MACHINE FOR MANUFACTURING STARCH MOLDED PRODUCTS SUCH AS CANDY AND APPARATUS AND STARCH LEVEL ADJUSTER AND METHOD FOR REDUCING STARCH LOSS IN SAME

(75) Inventor: Rob Klein, Durand, IL (US)

(73) Assignee: Liberty Engineering Company, Roscoe, IL (US)

( * ) Notice: Subject to any disclaimer, the term of this patent is extended or adjusted under 35 U.S.C. 154(b) by 101 days.

(21) Appl. No.: 09/871,828

(22) Filed: Jun. 1, 2001

(65) Prior Publication Data

US 2002/0001666 A1 Jan. 3, 2002

(51) Int. Cl.$^7$ ................................................ B29C 33/38
(52) U.S. Cl. ................ 264/219; 264/297.1; 264/297.6; 426/515
(58) Field of Search ................................ 426/515, 578; 264/219, 241, 297.1, 297.6

(56) References Cited

U.S. PATENT DOCUMENTS

| | | | |
|---|---|---|---|
| 1,894,651 A | * | 1/1933 | Werner et al. ............... 426/515 |
| 2,821,477 A |   | 1/1958 | Forkner ....................... 99/129 |
| 2,974,069 A | * | 3/1961 | Van Nieuwenhuyzen .... 127/71 |
| 3,226,239 A | * | 12/1965 | Schoch et al. ........... 106/38.51 |
| 3,446,628 A | * | 5/1969 | Schoch et al. ............... 426/578 |
| 3,589,909 A | * | 6/1971 | Godzicki et al. ............ 426/578 |
| 3,907,111 A | * | 9/1975 | Levenhagen ................. 206/511 |
| 4,547,143 A |   | 10/1985 | Cerreta ....................... 425/447 |
| 4,604,255 A | * | 8/1986 | Walt et al. ................... 264/273 |
| 4,874,628 A |   | 10/1989 | Eden et al. .................. 426/578 |
| 4,886,678 A |   | 12/1989 | Chiu et al. ................... 426/578 |
| 4,991,718 A | * | 2/1991 | Withers ....................... 206/511 |
| 5,059,441 A | * | 10/1991 | Bunick et al. ............... 426/515 |
| 5,441,753 A |   | 8/1995 | McGinley et al. ............ 426/96 |
| 5,549,921 A |   | 8/1996 | Robinson et al. ........... 426/573 |
| 5,626,896 A |   | 5/1997 | Moore et al. ................ 426/103 |
| 6,077,557 A |   | 6/2000 | Gordon et al. .............. 426/573 |

OTHER PUBLICATIONS

*How Black Forest Gummies Are Made* by Ferrara Pan (6 pages; undated, but prior to Applicant's filing date).
Website pages for *Mogul Plants Typ 460/462* (3 pages, dated Jan. 17, 2001).

* cited by examiner

Primary Examiner—Allan R. Kuhns
(74) Attorney, Agent, or Firm—Leydig, Voit & Mayer, Ltd.

(57) ABSTRACT

A method and apparatus for reducing starch loss in mogul machines. Starch is lowered below the tray edge such that starch does not spill over the tray side walls when cavities are stamped into the starch for receiving liquefied candy material. The leveling device may include a brush and a resilient plastic blade. The leveling device recycles starch into a collection hopper.

22 Claims, 4 Drawing Sheets

MOGUL MACHINE FOR MANUFACTURING STARCH MOLDED PRODUCTS SUCH AS CANDY AND APPARATUS AND STARCH LEVEL ADJUSTER AND METHOD FOR REDUCING STARCH LOSS IN SAME

FIELD OF THE INVENTION

The present invention relates generally to the art of food manufacturing, and more particularly relates to machines for manufacturing starch molded products also commonly known as mogul machines.

BACKGROUND OF THE INVENTION

Mogul machines have been used for many years in the manufacture of starch molded products such as pectin, gelantine, agar, agar-based jellies, gummies, liquorice, fondant, cream, marshmallow foam, and other similar materials. Many of these products are commonly referred to as candy. Mogul machines may also be used for depositing liqueur.

The typical process for making these forms of candy or other starch molded products include dumping starch into trays, stamping cavities in the starch, pumping a liquefied candy mixture into the cavities, curing of the candy to allow it to sufficiently harden (e.g. drying), and then separating the candy from the starch. While the above process results in high volume production of candy, it has drawbacks. One problem that has existed for years since the existence of mogul machines is that a large amount of starch is lost when the cavities are stamped into the tray full of starch, particularly during subsequent movement of the tray and vibrations which can cause starch to spill over the top wall of the tray. This can translate into a loss thousands of dollars of year for candy manufacturers.

BRIEF SUMMARY OF THE INVENTION

It is therefore an objective of the present invention to reduce the starch loss in mogul machines due to the stamping of cavities into the starch.

In that regard it is an further objective to reduce starch loss while maintaining speed and quality of starch molded products for economic feasibility.

In accordance with these and other objectives, the present invention is directed toward a method of reducing starch loss by lowering the level of starch below the tray edge. According to the method, the tray is first filled with starch. The tray has a horizontally extending base and a vertically extending peripheral border wall containing starch in the tray. The border wall has a top edge. The starch is then leveled in the tray to a level below the top edge. Then, a plurality of cavities a formed into the starch which are then filled with liquefied starch molded mixture (e.g. liquefied candy). The liquefied starch molded mixture is then cured (e.g. dried) to form the starch molded products such as candy. The starch molded products are then separated from the starch.

The present invention is also direct toward a mogul machine for manufacturing a plurality of starch molded products. The mogul machine uses a plurality of trays that hold starch. Each tray has a horizontally extending base and a vertically extending peripheral border wall containing starch in the tray. A conveyor mechanism conveys the trays with the top edge of the tray situated at a first vertical height. A starch depositor disposed along the conveyor mechanism deposits starch into the trays. A starch leveler (comprising at least one resilient member with a bottom leveling edge) levels the starch to a second vertical height below the first vertical height. The resilient member is sufficiently resilient to deflect past the top edge of the tray without damage to the tray or the resilient member. A recycling hopper is disposed underneath the starch leveler to catch starch removed by the starch leveler. After leveling of starch, the trays pass through a stamping station where a stamping plate stamps cavities into starch in the tray. The trays then pass through a pumping station that pumps liquefied starch molded product into cavities.

The present invention also directed toward an apparatus for reducing starch loss in a mogul machine that can be used on an existing mogul machine as a retrofit or used in a new mogul machine. The apparatus comprises a pair of mounts for mounting to the mogul machine. The mounts are mounted to the mogul machine in spaced apart relation a distance greater than a width of the conveyor mechanism but less than an overall width of the mogul machine. A pair of support posts project vertically from the mounts such that the posts extend vertically above the conveyor mechanism when the mounts are mounted to the mogul machine. A cross support extends horizontally between the posts and is supported by the posts. An elongate blade is mounted to the cross support and extends vertically downwardly from the cross support. An elongate brush is also mounted to the cross support and extends vertically downwardly from the cross support in spaced relation to the elongate blade.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
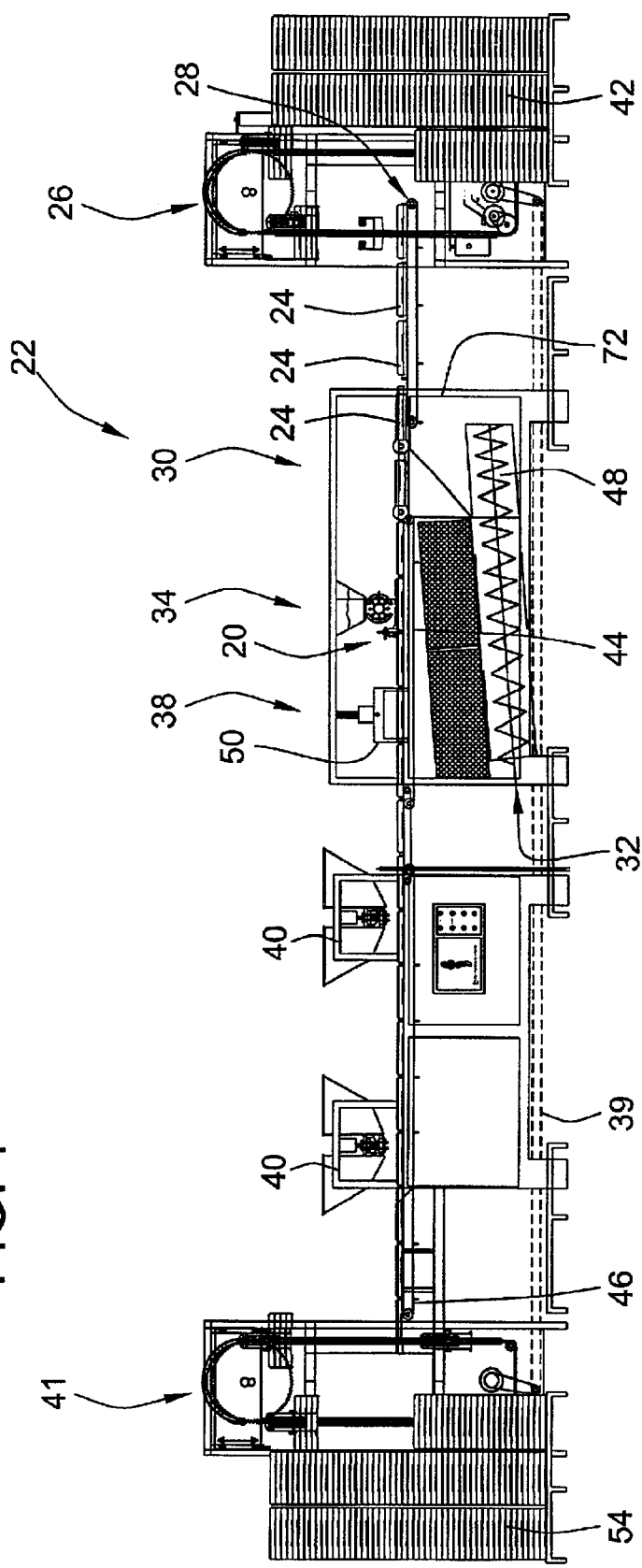
FIG. 1 is a side elevation view of a preferred embodiment of a mogul machine.
Figure 2:
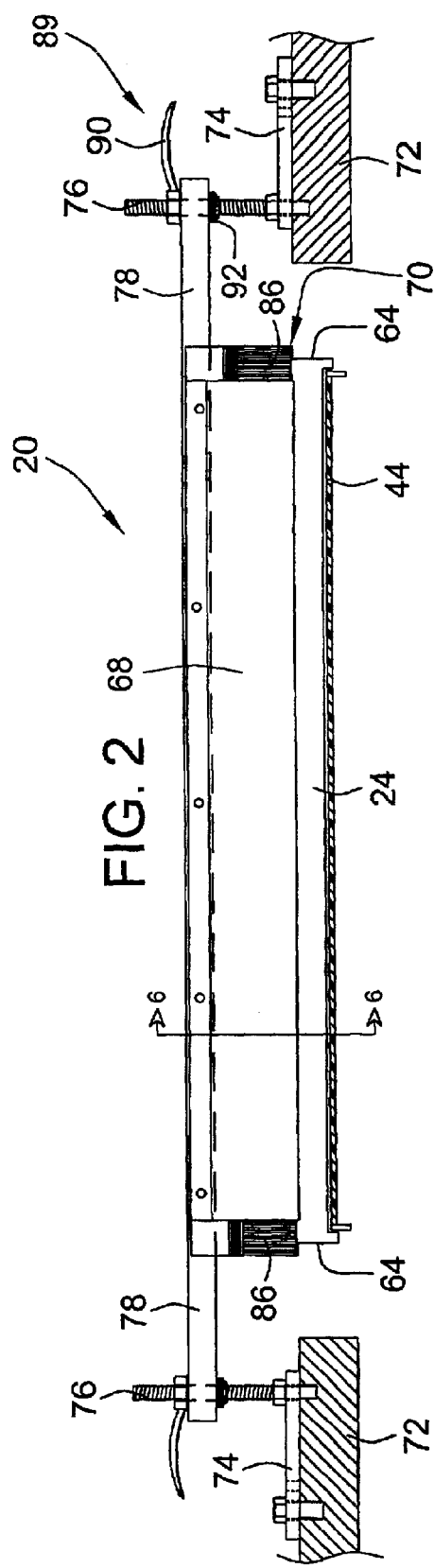
FIG. 2 is a front elevation of a preferred embodiment of a starch leveler for use on a mogul machine such as that illustrated in FIG. 1 with part of the mogul machine frame and conveyor carrying a tray illustrated.
Figure 3:
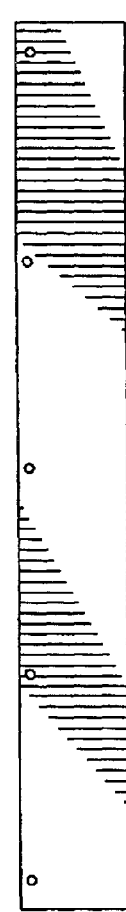
FIG. 3 is a front view of the brush of the starch leveler illustrated in FIG. 2.
Figure 4:
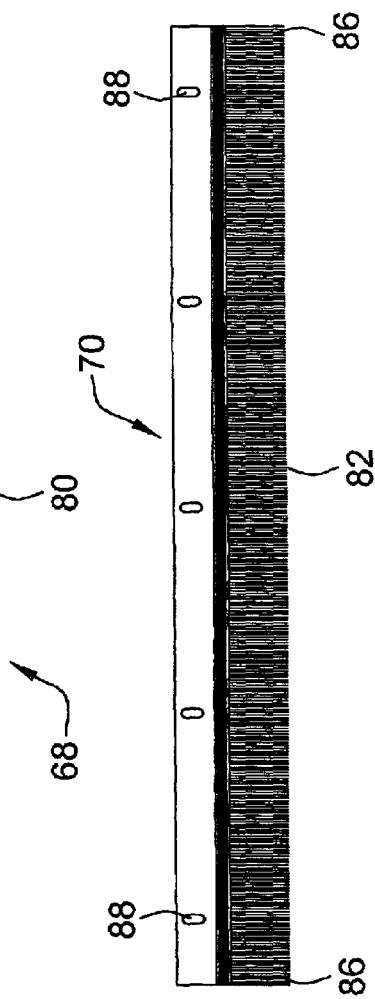
FIG. 4 is a front view of the resilient leveling blade of the starch leveler illustrated in FIG. 2.
Figure 5:
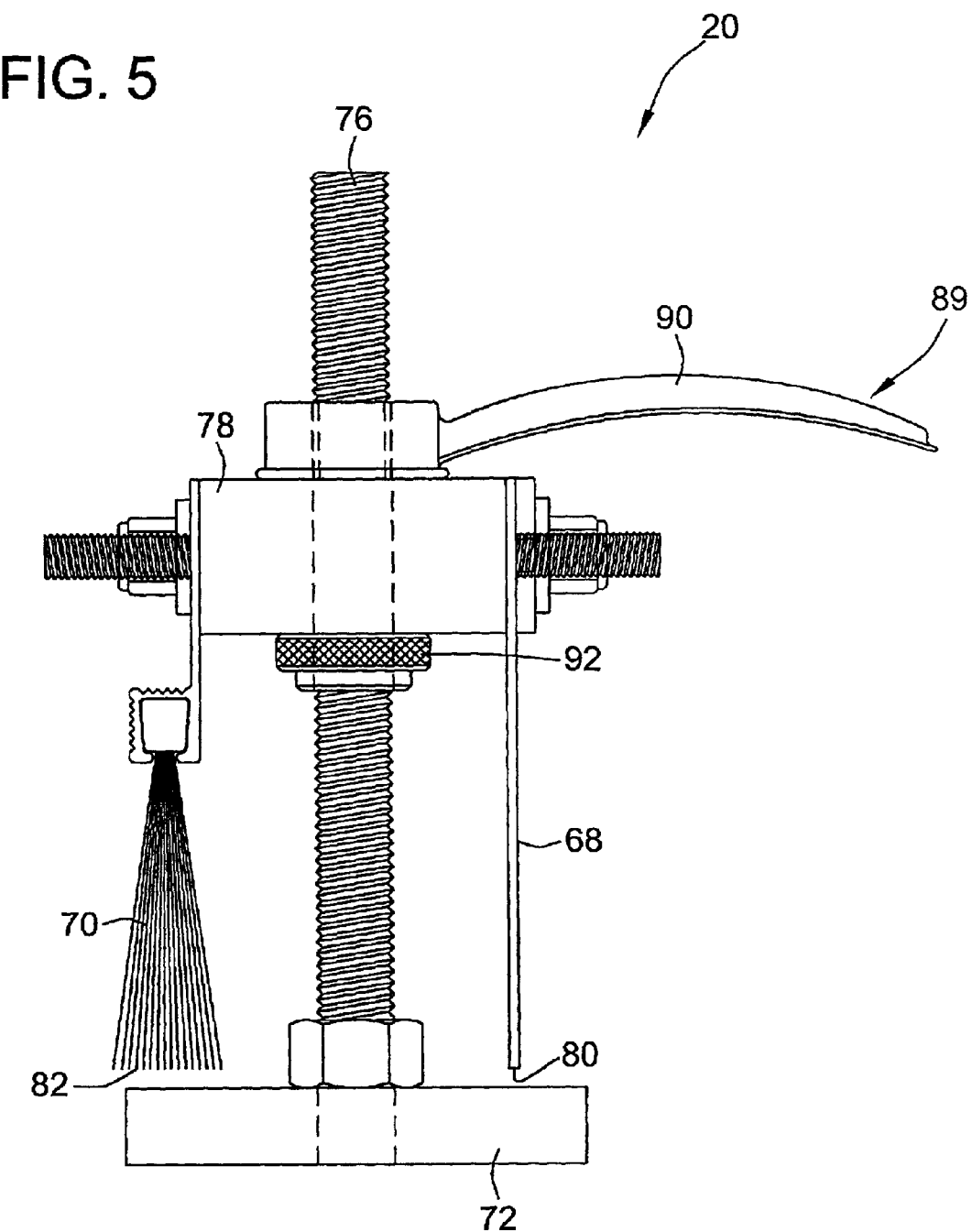
FIG. 5 is a side elevation of the starch leveler illustrated in FIG. 2.

A preferred embodiment of the present invention has been depicted as starch leveler 20 as illustrated in FIGS. 2–3 incorporated into a mogul machine 22 as illustrated in FIG. 1. Referring to FIG. 1, the mogul machine 22 includes multiple stations through which a plurality of trays 24 travel in order to make starch molded products such as candy. For purposes of reference, the disclosed mogul machine 20 includes generally the following stations/systems: a tray feeder 26, a conveyor mechanism 28, a starch and candy dumping mechanism 30, a starch separation and reclamation system 32, a starch depositor 34, a starch leveler 20, a candy cavity stamping station 38, one or more candy pumping stations 40, a tray stacker 41 and a bottom tray return conveyor 39. Although one particular form of a mogul machine 22 is disclosed, other mogul machine configurations are known. As such, it will be appreciated that the invention is applicable across all mogul machines which can be used to stamp or print cavities into starch and fill the cavities with liquefied candy material.

In operation, trays 24 containing cured (or dried) candy and starch from a previous run are stacked in a vertical stack 42 proximate the tray feeder 26. The tray feeder 26 takes individual trays 24 and feeds them onto the conveyor mechanism 28. The disclosed conveyor mechanism 28 is divided into two sections comprising an upstream intermittent belt conveyor 44 and a downstream controlled movement belt conveyor 46 (although belt conveyors are illustrated it will be appreciated that other conveyor mechanisms such as walkers common in other mogul machines may also be used). The cured candy and starch in each tray 24 is first dumped at the dumping station 30 where a rotating tumbler 48 may be used to separate starch from candy. Starch is separated and reclaimed in the starch separation and reclamation system 32 where starch is recovered in a collection hopper 52. After the trays 24 are dumped, the now empty trays 24 are moved downstream to the starch depositor 34. The starch depositor 34 deposits starch into the individual trays 24. The depositor 34 also preferably measures the starch to get a rough level of starch in the tray close to the desired amount, typically just more than is necessary. The conveyor 44 then moves the trays 24 through a leveler 20 that levels the starch and then through a stamping station 38 that imprints a plurality of candy cavities into the starch. The stamping station 38 includes a vertically driven plate having a plurality of candy shaped molds projecting therefrom. The intermittent belt conveyor 44 then delivers the trays to the controlled motion belt conveyor 46. The controlled motion belt conveyor 46 transfers trays through the one or more candy pumping stations 38 that fill the cavities will liquefied candy material. Thereafter, the conveyor 46 moves the trays now filled with starch and candy to the tray stacker 41 which stacks the trays in vertical stacks 54 for drying or curing the candy.

Figure 6:
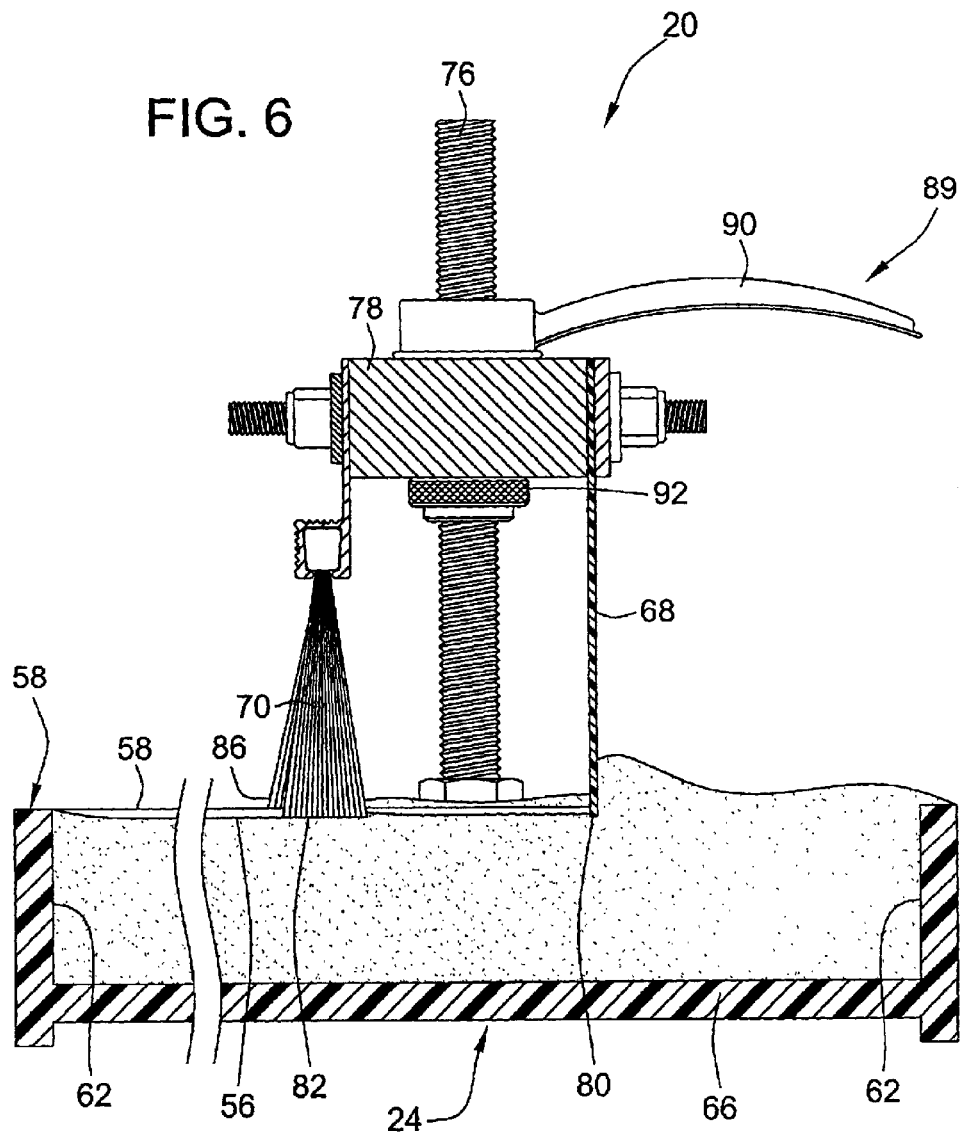
FIG. 6 is a cross section of the starch leveler of FIG. 2 illustrated in operation on an exemplary tray of starch.

In accordance with the invention, the starch leveler 20 levels and lowers the starch in the tray 24 to a level 56 below the top edge 58 of the tray 56, as can be best seen in FIG. 6 (see also FIG. 2). By lowering the starch in the tray 24 to the lower level 58, the starch which is displaced vertically upward due to cavity formation at the stamping station 38 stays in the tray 24 displacing upwardly roughly to the top edge 58 and is not pushed up on top of the top edge 58 or otherwise does not substantially protrude above the top edge 58 such that the starch in the tray is not prone to spilling over onto the floor in large quantities due to tray movement and vibrations further downstream for example at the pumping stations 40.

For purposes of reference, each tray 24 is generally rectangular including a border wall comprised of a leading wall 60, and trailing wall 62, and side walls 64 perpendicularly therebetween. The walls 60, 62, 64 project vertical upward from a horizontal support base 66 to form the top edge 58. In the disclosed embodiment, the tops of all of the walls 60, 62, 64 lie in the same horizontal plane.

To lower the starch level in the disclosed embodiment, the starch leveler 20 includes resilient material such that it can deflect past the leading and trailing walls 60, 62 of the tray 24. The starch leveler 20 includes two separate engaging devices including an elongate, resilient, plastic blade 68 and an elongate, resilient, plastic fiber brush 70. The leveler 20 is mounted to the mogul machine frame 72 with a pair of mounts in the form of end flanges 74, one on each side of the conveyor 28 or tray 24. The end flanges 74 affix the starch leveler to the frame 72 in a stationary position. The end flanges 74 support a pair of support posts in the form of threaded rods 76. The threaded rods 76 project vertically upward from the flanges 74 above the conveyor mechanism 28 to support a horizontally extending cross support 78. The cross support 78 in turn is fastened to and supports both the blade 68 and the brush 70.

The blade 68 leads the brush 68. The blade 68 has a length that is shorter than the length between sidewalls 64 such that blade 68 fits inside the tray 24 perpendicularly between sidewalls 64 and below the tray top edge 58 in order to effectively scrape starch to the level 56 below the tray top edge 58. In operation, the blade 68 engages and deflects past the leading wall 60 of the tray in order to enter the tray 24 with its bottom edge 80 below the tray top edge 58. The blade 68 also engages and deflects past the trailing wall 62 in order to exit the tray 24 (and thereafter enter the next tray). While in the tray, the blade 68 scrapes and removes most of the desired starch material thereby effectively leveling starch below the tray top edge 58 and thereby reducing starch loss.

In the disclosed embodiment, the brush 70 performs a clean up operation to even better reduce starch loss. The brush 70 runs generally parallel to and behind the blade 68 to sweep up starch and smooth the starch further. In operation, the brush 70 engages and deflects past the leading wall 60 of the tray in order to enter the tray 24 with its bottom edge 82 below the tray top edge 58. The brush 70 also engages and deflects past the trailing wall 62 in order to exit the tray 24. In contrast to the blade 68, however, the brush 70 is longer in length than distance between tray sidewalls 64 such that end portions 86 of the brush 70 engage and sweep starch from the tops of the sidewalls 64 that is left behind by the blade 68. Starch removed by the blade 68 or brash 70 drops down via gravity into the underlying hopper 52 for collection and recycling.

The bottom edges 80, 82 of the blade 68 and brush 70 lie in parallel horizontal planes. The brush 70 is preferably just lower than the blade 68 by a couple of millimeters, typically anywhere from 0 to 3 millimeters. The exact spacing between the bottom edges 80, 82 can be adjusted by an adjustment mechanism in the form of oval slots 88 in the brush 70 (or alternatively in the blade) which allow for vertical adjustment before the brush 70 is locked into position by fasteners to the cross support 78. Different vertical spacings between the bottom edges 80, 82 may be beneficial for different candy applications.

The starch leveler 20 also includes a vertical actuator mechanism 89 in the disclosed form of a handle nut 90 and knurled nut 92 engaging the threaded rods 76 to support and position the cross support 78 vertically (and therefore the blade and brush vertically as well). The actuator mechanism 89 can be used to precisely set the heights of the blade 68 and brush 70 relative to the tray top edge 58. The actually setting typically depends upon the depth of the candy to be imprinted into the starch as deeper imprints or more closely spaced imprints can displace greater amounts of starch. It has been found that setting the starch level 56 below the tray top edge 58 by an amount of between 2 and 6 millimeters has been most effective for most applications. The level 56 is set low enough so as to prevent starch from displacing over the tray during subsequent handling, but also high enough so that candy cavities properly form in the top of the starch at the stamping station 38. When the machine 22 is changed from one candy pattern to a different candy pattern, the vertical actuator mechanism 89 may be used to optimize starch loss and the proper formation of candy cavities.

Although a stationary starch leveler 20 has been disclosed wherein trays are conveyed past the blade and the brush, the invention also contemplates a driven starch leveler as an alternative to lower the starch level below the tray top edge.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of manufacturing a plurality of starch molded products, comprising:
    filling a tray with starch, the tray having a horizontally extending base and a vertically extending peripheral border wall containing starch in the tray, the border wall having a top edge;
    leveling the starch in the tray to a level below the top edge;
    forming a plurality of cavities into the starch contained in the tray;
    filling liquefied mixture into the cavities;
    curing the liquefied mixture to form the starch molded products;
    separating starch molded products from the starch; and
    wherein the leveling step comprises:
    scraping a top layer of starch from the tray filled with starch at the level with an elongate blade, thereafter;
    brushing the starch in the tray at the level with an elongate brush.

2. The method of claim 1, further comprising:
    selectively adjusting the level of the starch in the tray relative to an amount of starch displaced as a result of the cavities formed during the stamping step.

3. The method of claim 2 wherein the selectively adjusting step sets a level of the starch in the tray that is between 1 and 10 millimeters below the top edge of the tray.

4. The method of claim 1 wherein the tray is rectangular with a leading wall, a trailing wall, and first and second side walls transversely between leading and trailing walls forming the border wall, wherein the elongate blade fits transversely between the first and second side walls, the brush being longer than the elongate blade and engaging the side walls to brush starch carried on top of the side walls.

5. The method of claim 1 wherein the leading wall, the trailing wall and the side walls have top ends that lie in a common plane to form the top edge, the elongate blade being resilient and flexible, the step of scraping further comprising:
    deflecting a bottom edge of the elongate blade past the leading wall and allow entry of the blade into the tray below the top edge; and
    deflecting the elongate blade past the trailing wall to allow exit of the blade from the tray.

6. The method of claim 1, further comprising collecting scraped and brushed starch in a recycling hopper underneath the tray.

7. The method of claim 1, wherein the blade and brush are fixed in a stationary position, further comprising conveying the tray past the blade and the brush.

8. The method of claim 7, further comprising:
    simultaneously and selectively adjusting the level of the brush and the blade vertically relative to the tray relative to an amount of starch displaced as a result of the cavities formed during the stamping step.

9. The method of claim 8 wherein the adjusting step sets a level of the starch in the tray that is between 1 and 10 millimeters below the top edge of the tray.

10. The method of claim 1 wherein the step of forming a plurality of cavities further comprises displacing starch vertically upward above the level due to the formation of the cavities and substantially equivalent to a vertical height of the top edge, preventing substantially all starch from spilling over the top edge by leveling the starch in the tray to a sufficient level below the top edge.

11. A method of manufacturing a plurality of starch molded products with a mogul machine, comprising:
    conveying a plurality of empty trays on a conveyor mechanism;
    depositing starch in the empty trays, the tray having a horizontally extending base and a vertically extending peripheral border wall containing starch in the tray, the border wall having a top edge;
    leveling the starch deposited with at least one resilient member, the resilient member deflecting past the top edge to enter and exit the tray, the resilient member having a bottom edge dropping below the top edge when in the tray to level starch in the tray below the top edge;
    stamping a plurality of cavities into the starch contained in the tray, the formation of the cavities displacing starch vertically upward toward the top edge, the starch being prevented from spilling over the top edge due to the leveling;
    pumping liquefied mixture into the cavities;
    curing the liquefied mixture to form the starch molded products; and
    separating starch molded products from the starch.

12. The method of claim 11, further comprising:
    selectively adjusting the leveling of the starch in the tray relative to an amount of starch displaced as a result of the cavities formed during the stamping step.

13. The method of claim 11 wherein the selectively adjusting step sets a level of the starch in the tray that is between 1 and 10 millimeters below the top edge of the tray.

14. The method of claim 11, wherein the leveling step comprises:

scraping a top layer of starch from the tray filled with starch at the level with an elongate blade, thereafter;

brushing the starch in the tray at the level with an elongate brush, whereby the elongate brush and the elongate blade comprise two of the resilient members.

15. The method of claim 14 wherein the tray is rectangular with a leading wall, a trailing wall, and first and second side walls transversely between leading and trailing walls forming the border wall, wherein the elongate blade fits transversely between the first and second side walls, the brush being longer than the elongate blade and engaging the side walls to brush starch carried on top of the side walls.

16. The method of claim 14 wherein the leading wall, the trailing wall and the side walls have top ends that lie in a common plane to form the top edge, said deflecting comprising:

deflecting a bottom edge of the elongate blade past the leading wall and allowing entry of the blade into the tray below the top edge; and deflecting the elongate blade past the trailing wall to allow exit of the blade from the tray.

17. The method of claim 14, further comprising collecting scraped and brushed starch in a recycling hopper underneath the tray.

18. The method of claim 14, wherein the blade and brush are fixed in a stationary position, wherein the tray is conveyed past the blade and the brush.

19. The method of claim 18, further comprising:

simultaneously and selectively adjusting the level of the brush and the blade vertically relative to the tray relative to an amount of starch displaced as a result of the cavities formed during the stamping step.

20. The method of claim 19 wherein the adjusting step sets a level of the starch in the tray that is between 1 and 10 millimeters below the top edge of the tray.

21. The method of claim 11 wherein the step of forming further comprises displacing starch vertically upward above the level due to the formation of the cavities and substantially equivalent to a vertical height of the top edge, preventing starch from spilling over the top edge.

22. The method of claim 11 wherein the conveying comprises intermittently conveying for the depositing leveling and stamping steps and controlled conveying for the pumping step.

\* \* \* \* \*